United States Patent [19]
Peterson

[11] 3,794,161
[45] Feb. 26, 1974

[54] POTATO CUTTING MACHINE

[76] Inventor: Soren Eskel Peterson, 875 S. Redwood Rd., Salt Lake City, Utah 84104

[22] Filed: Nov. 10, 1971

[21] Appl. No.: 197,220

[52] U.S. Cl............... 209/106, 15/3.11, 198/33 AA
[51] Int. Cl............................................. B07b 13/04
[58] Field of Search. 209/83, 90, 102, 106; 15/3.11; 198/33 AA, 127, 183

[56] References Cited
UNITED STATES PATENTS

| | | | |
|---|---|---|---|
| 2,353,941 | 7/1944 | Stebler | 209/106 |
| 2,588,309 | 3/1952 | Troyer | 209/106 |
| 3,386,557 | 6/1968 | Ross | 198/33 AA |
| 3,217,346 | 11/1965 | Silver | 209/106 X |

Primary Examiner—Richard A. Schacher
Attorney, Agent, or Firm—Lynn G. Foster

[57] ABSTRACT

A potato cutting machine including means for eliminating sprouts and other debris comprising a first plurality of driven rollers disposed in a common plane for transporting potatoes, a second plurality of driven rollers extending upwardly and rearwardly from said first plurality of rollers in stepwise fashion and having at least one of said second plurality of rollers rotating in a direction reverse from that of said first plurality of rollers, means for delivering potatoes and debris to said second plurality of rollers, and means for aligning potatoes for presentation to a cutting mechanism, said aligning means comprising a conveyor having a plurality of transverse troughs, and a plurality of resilient bands extending across said conveyor and spaced above said conveyor a distance such that properly aligned potatoes lying in said troughs will pass under said bands while improperly aligned potatoes will engage said bands and be restrained thereby.

16 Claims, 4 Drawing Figures

PATENTED FEB 26 1974 3,794,161

POTATO CUTTING MACHINE

BACKGROUND

1. Field of Invention

This invention relates to farm machinery and is particularly directed to apparatus for sorting and cutting potatoes into seed.

In the art of potato farming, those potatoes which are not sold are frequently stored through the winter and replanted in spring as seeds for a new crop. Small potatoes may be planted whole, while medium and large potatoes are cut into several pieces which may each be planted independently.

2. Prior Art

In the past, the cutting of potatoes into seeds was performed manually. However, with recent trends toward larger farms and automation, machines have been developed for accomplishing this. Unfortunately, the potatoes have frequently started to sprout before they are fed to the machines to be cut into seeds and, during handling, the sprouts often become broken or separated from the potatoes and, in passing through the machines, tend to become wrapped around and clog the machines. Accordingly, it is desirable to remove these loose sprouts. However, in prior art potato cutting machines, no means has been provided for accomplishing this. Moreover, potatoes are frequently oblong in shape and it is desirable to present the potatoes to the cutting blades with the axis of the potatoes extending at right angles to the plane of the cutting blade so that the potatoes will be cut transversely, rather than lengthwise. Various types of mechanisms have been proposed for accomplishing such alignment. However, none of the prior art devices have been entirely satisfactory.

These disadvantages of the prior art are overcome with the present invention and a potato cutting machine is provided which includes means for quickly and easily removing loose sprouts and for assuring proper alignment of the potatoes for presentation to the cutters.

BRIEF SUMMARY AND OBJECTS OF INVENTION

The advantages of the present invention are preferably attained by providing a first plurality of rollers mounted in stepwise relation and having at least one of said rollers rotating in a direction reverse to that of the other rollers to cause loose sprouts to be discharged between said one roller and adjacent rollers, together with a plurality of resilient bands extending across the machine and spaced above a conveyor formed of rollers a distance such that potatoes which are properly aligned will lie in the troughs between adjacent rollers and will pass under the bands, while potatoes which are improperly aligned will be caused to engage the bands and will be restrained by the bands and will be realigned into proper alignment.

Accordingly, it is an object of the present invention to provide an improved potato cutting machine.

Another object of the present invention is to provide a potato cutting machine having means for removing loose sprouts.

A further object of the present invention is to provide improved means for aligning potatoes in a potato cutting machine.

A specific object of the present invention is to provide a potato cutting machine comprising a first plurality of rollers mounted in stepwise relation and having at least one of said rollers rotating in a direction reverse to that of the other rollers to cause loose sprouts to be discharged between said one roller and adjacent rollers, together with a conveyor formed of a plurality of spaced rollers and a plurality of resilient bands extending across the machine and spaced above said conveyor a distance such that potatoes which are properly aligned and lying in the troughs between the rollers of the conveyor will pass beneath the bands, while potatoes which are improperly aligned will be caused to engage the bands and will be restrained and realigned thereby.

These and other objects and features of the present invention will be apparent from the following detailed description, taken with reference to the accompanying drawings.

DETAILED DESCRIPTION OF ILLUSTRATED EMBODIMENT

Figure 1:
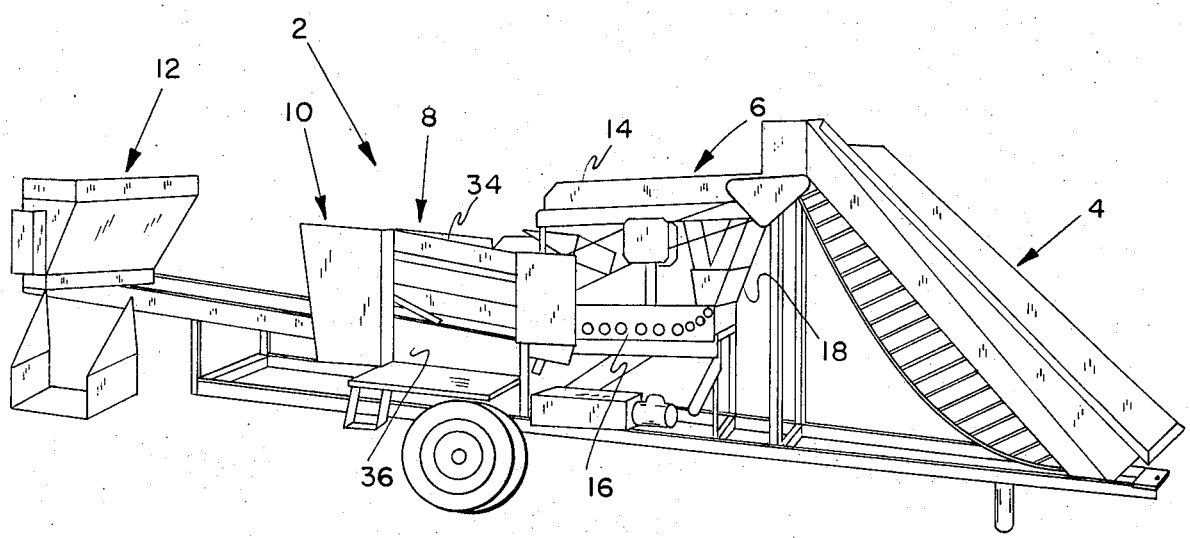
FIG. 1 is an isometric view of a potato cutting machine embodying the present invention.

In that form of the present invention chosen for purposes of illustration, FIG. 1 shows a potato cutting machine, indicated generally at 2, having a ramp conveyor 4 which receives potatoes and carries them to a sorting section, indicated generally at 6. The potatoes are separated according to size in the sorting section 6 and passed to an aligning section, indicated generally at 8, where the potatoes are aligned and supplied to a cutting section, indicated generally at 10, and, thence, to a sacking section, indicated generally at 12.

Figure 2:
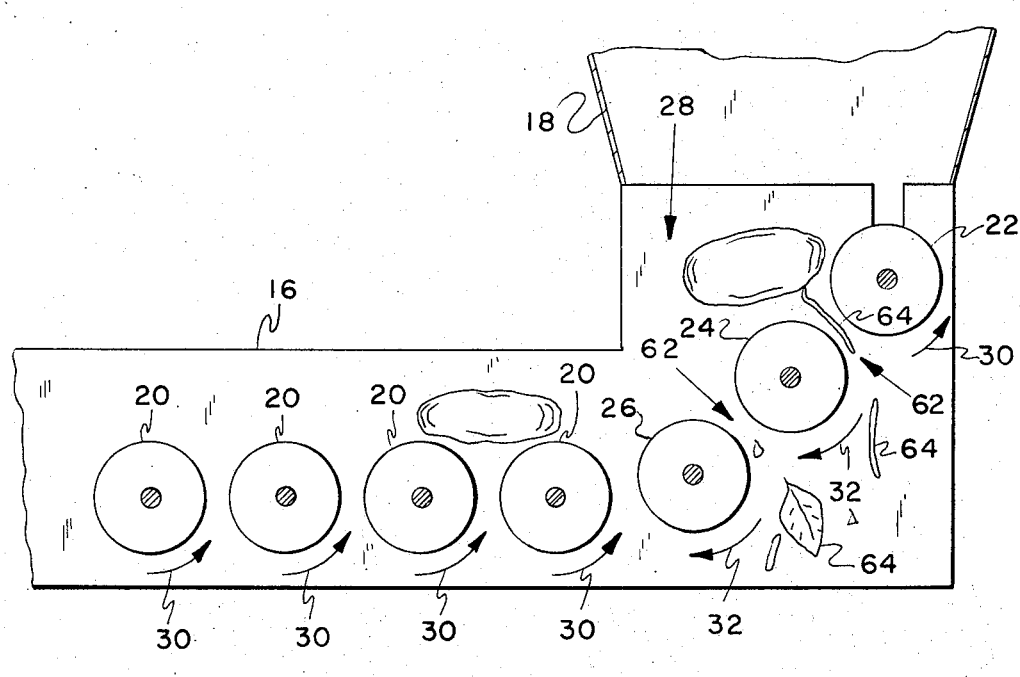
FIG. 2 is a vertical section taken on the line 2—2 of FIG. 1.

The sorting section 6 comprises an upper tier 14 and a lower tier 16. The upper tier 14 comprises a plurality of driven rollers, not shown, which are spaced apart sufficiently to pass only large potatoes, while allowing medium and small potatoes to fall between the rollers to lower tier 16, through a chute 18 or the like, together with any debris, such as leaves, loose sprouts, and the like. As best seen in FIG. 2, the lower tier 16 comprises a plurality of driven rollers 20 lying in a common plane with the three rollers 22, 24 and 26, adjacent the entry end 28, disposed upwardly and rearwardly from the rollers 20 in stepwise fashion. Rollers 20 and 22 rotate in a counter-clockwise direction, as indicated by arrows 30, while rollers 24 and 26 rotate in a clockwise direction, as indicated by arrows 32. The rollers 22, 24 and 26 are preferably formed with either smooth or longitudinally corrugated surfaces, while the rollers 20 are formed to facilitate movement of the potatoes.

Figure 4:
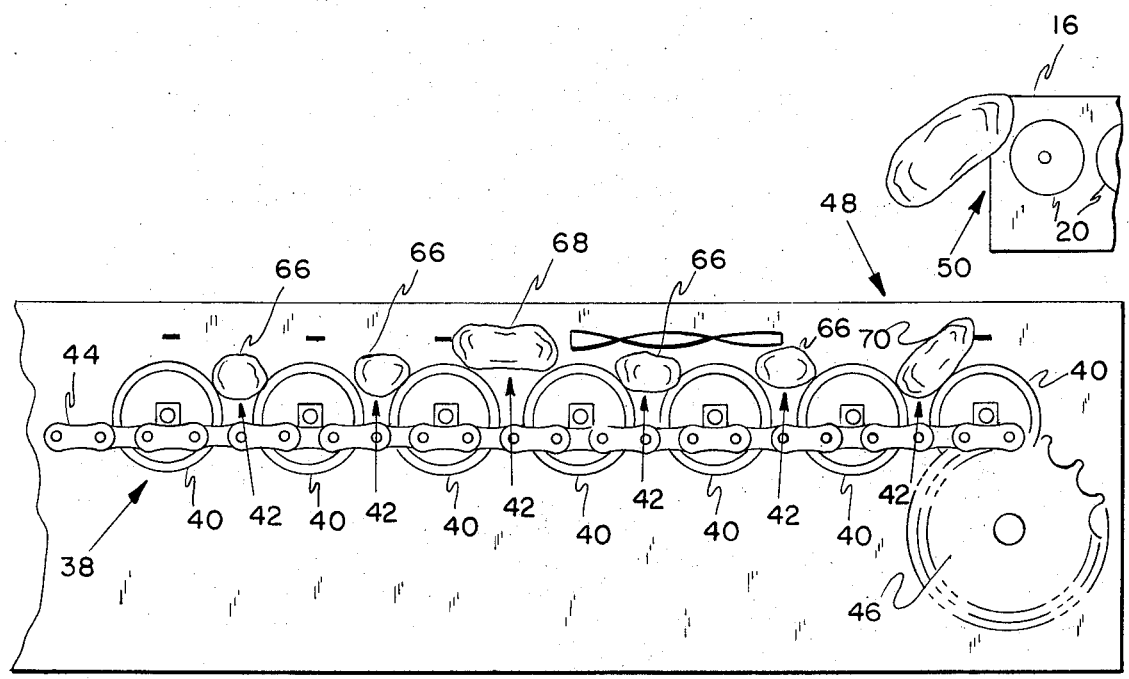
FIG. 4 is a vertical section taken on the line 4—4 of FIG. 3.
Figure 3:
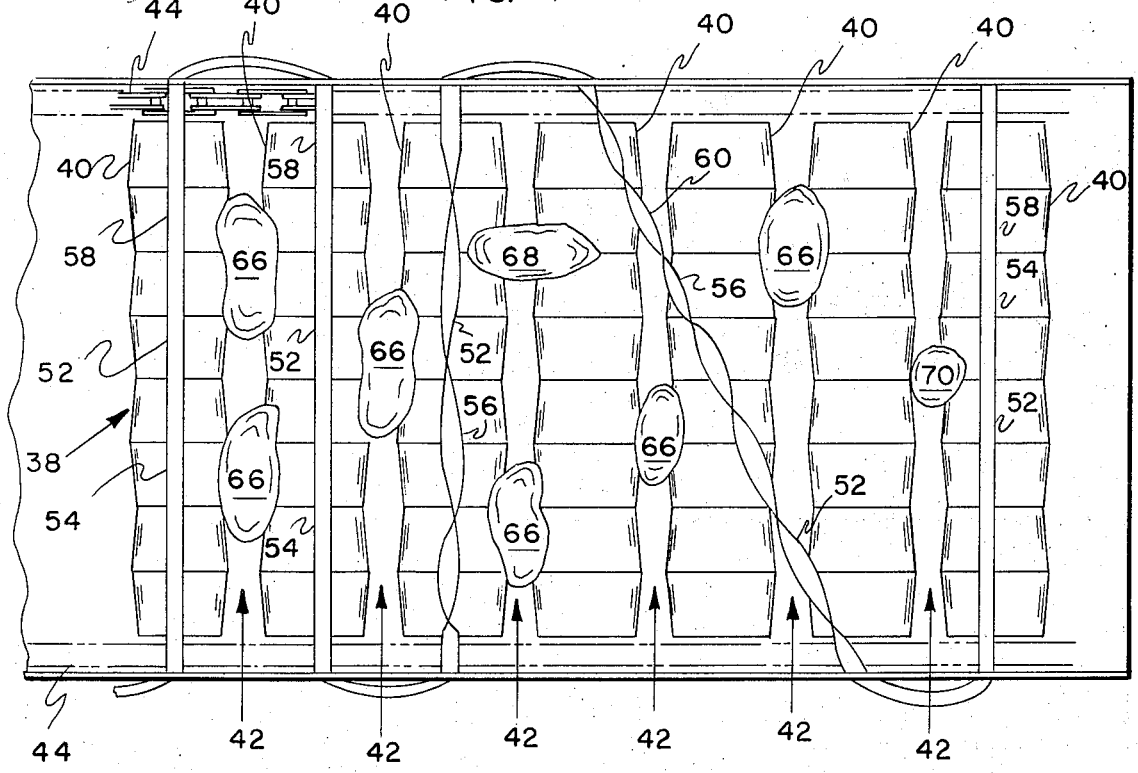
FIG. 3 is a horizontal section taken on the line 3—3 of FIG. 1.

The alignment section 8 also comprises an upper tier 34 and a lower tier 36. The two tiers 34 and 36 may be substantially identical and, as shown in FIGS. 3 and 4, the lower tier 36 comprises a conveyor 38 formed of a plurality of rollers 40 spaced apart to provide troughs 42 therebetween and connected for movement by an endless chain 44 which passes about suitable sprockets, such as sprocket 46, adjacent the limits of travel of the conveyor 38. As shown, the entry end 48 of the conveyor 38 is positioned to receive potatoes from the discharge end 50 of the lower tier 16 of sorting section 6, while the discharge end of conveyor 38 serves to pass potatoes to the cutting section 10, in the manner shown and described in my U.S. Pat. No. 3,291,176, issued Dec. 13, 1966. Finally, a plurality of resilient bands 52 are provided extending transversely across conveyor 38 and spaced slightly above the rollers 40 of conveyor 38. The bands 52 may be either flat, as seen at 54, or helically twisted, as seen at 56, and may extend across conveyor 38 either straight, as seen at 58, or diagonally, as seen at 60.

In use, potatoes to be cut into seeds are dumped onto ramp conveyor 4 which deposits them on the upper tier 14 of sorting section 6. Large potatoes are retained by upper tier 14 and are passed to upper tier 34 of alignment section 8, while medium and small potatoes, together with leaves, loose sprouts and other debris, fall through upper tier 14 of sorting section 6 and pass through chute 18 to roller 22 of the lower tier 16 of sorting section 6. Due to their weight, potatoes will roll downward over rollers 22, 24 and 26 to the rollers 20 and will be carried by the rollers 20 to the discharge end 50 of the lower tier 16 of sorting section 6. In contrast, leaves, sprouts and other debris are relatively light and, hence, will be deposited by roller 22 on the reversely-rotating rollers 24 and 26 and will be discharged through the spaces 62 between rollers 22, 24 and 26, as seen at 64. Roller 22 is preferably rotated in the same direction as rollers 20 in order to prevent jamming of potatoes adjacent chute 18.

From the discharge end 50 of lower tier 16 of the sorting section 6, the potatoes are deposited on conveyor 38 of lower tier 36 of the alignment section 8. As indicated above, it is desirable that the potatoes be oriented transversely to the cutters and the purpose of the alignment section 8 is to achieve this orientation. Obviously, some potatoes will be delivered to the alignment section with substantially the desired orientation. These potatoes will fall into the troughs 42 between the rollers 40 of conveyor 38 and will pass under the resilient bands 52 without interference, as seen at 66. On the other hand, some potatoes will be delivered to the alignment section 8 oriented substantially lengthwise of the conveyor 38. These potatoes will either ride on the tops of adjacent rollers 40, as seen at 68, or will ride with one end in a trough 42 and the other end projecting upwardly, as seen at 70. In either of these cases, the potatoes will engage the bands 52 and will be restrained thereby, while the conveyor 38 will continue to move beneath them. As a result, the misaligned potatoes will be held back and tumbled about until they achieve the desired orientation and fall into one of the troughs 42, whereupon, they will be carried under the bands 52 to the cutting section 10. It is desirable to provide a plurality of the bands 52 since, due to the tumbling action or crowding from additional potatoes, it is possible for a potato to pass over or under the leading one of the bands 52. However, where two or more of the bands 52 are provided, it is found that virtually all of the potatoes will be properly oriented prior to delivery to the cutting section 10. While all of the bands 52 may be either flat, as seen at 54, or twisted, as seen at 56, and may extend across conveyor 38 either straight, as seen at 58, or diagonally, as seen at 60, it is preferable that a combination of these be employed since each of these configurations serves to tumble the potatoes in a respective manner and the combined effects serve to more rapidly align the potatoes.

Obviously, numerous variations and modifications may be made without departing from the present invention. Accordingly, it should be clearly understood that the form of the present invention described above and shown in the accompanying drawings is illustrative only and is not intended to limit the scope of the invention.

What is claimed is:

1. A potato cutting machine comprising:

sorting means for sorting potatoes according to size, chute means positioned to receive potatoes and debris of less than a predetermined size from said sorting means, a first plurality of driven rollers disposed in a common plane and serving to transport potatoes passed by said chute means, a second plurality of driven rollers disposed adjacent said chute means upwardly and rearwardly from said first plurality of rollers in stepwise fashion with at least one of said second plurality of rollers rotating in a direction reverse to that of an adjacent roller, an aligning conveyor comprising a plurality of transversely-extending troughs having an entry end positioned to receive potatoes from said first plurality of rollers and seving to transport said potatoes to a cutting mechanism, and a plurality of resilient bands extending substantially transversely across said conveyor and spaced above said conveyor a distance such that potatoes aligned with and lying in said troughs will pass under said bands while improperly aligned potatoes will engage and be retained by said bands.

2. The device of claim 1 wherein:

said first plurality of rollers all rotate in a common direction, and said one of said second plurality of rollers rotates in a direction opposite to said common direction.

3. The device of claim 2 wherein:

at least one other of said second plurality of rollers rotates in said common direction.

4. The device of claim 3 wherein:

said one of said second plurality of rollers is interposed between said first plurality of rollers and said other of said second plurality of rollers.

5. The device of claim 1 wherein:

said first plurality of rollers all rotate in a common direction, and said second plurality of rollers comprises three rollers with the two rollers adjacent said first plurality of rollers rotating in a direction opposite from said common direction and the roller remote from said first plurality of rollers rotating in said common direction.

6. The device of claim 5 wherein:

said common direction is one which tends to urge potatoes away from said chute means.

7. The device of claim 1 wherein:

at least one of said resilient bands is flat.

8. The device of claim 1 wherein:

at least one of said resilient bands is helically twisted.

9. The device of claim 1 wherein:
at least one of said resilient bands extends parallel to said troughs.

10. The device of claim 1 wherein:
at least one of said resilient bands extends diagonally with respect to said troughs.

11. A sprout eliminator for potato cutting machines comprising:
a first plurality of driven substantially smooth rollers disposed in a common plane,
a second plurality of driven substantially smooth rollers disposed upwardly and rearwardly in stepwise fashion adjacent one end of said first plurality of rollers,
each of said two pluralities of rollers being spaced from each adjacent roller by a substantial distance,
chute means for vertically delivering a continual supply of potatoes and sprouts directly downwardly upon the top two of said second plurality of rollers, means rotating the first one of each of the two plurality of rollers in a common direction, and
means rotating the remaining ones of said second plurality of rollers in a direction opposite to said common direction whereby vertically delivered potato is scrubbed on its surface by the initial two adjacent substantially spaced oppositely rotating rollers of the second plurality and thereafter by the last roller of the second plurality and the oppositely rotating first roller of the first plurality, causing sprouts to be removed from the potatoes and all loose sprouts to fall by gravity through the substantial spaces between the rollers.

12. Potato aligning means for a potato processing machine comprising:
a conveyor having a plurality of transverse rollers defining a transverse trough between each two rollers to transport potatoes along a processing path in the machine, and
a plurality of static slender resilient bands extending across said conveyor generally transverse of said path, and spaced above said conveyor a distance such that properly aligned potatoes essentially parallel to said troughs will normally pass under said static bands while improperly aligned potatoes will engage the adjacent band causing deflection of the bands and proper realignment of potatoes.

13. The device of claim 12 wherein:
at least one of said resilient bands is flat.

14. The device of claim 12 wherein:
at least one of said resilient bands extends parallel to said troughs.

15. The device of claim 12 wherein:
at least one of said resilient bands extends diagonally with respect to said troughs.

16. Potato aligning means for potato cutting machines comprising:
a conveyor having a plurality of transverse troughs movable to transport potatoes,
a plurality of resilient bands extending across said conveyor and spaced above said conveyor a distance such that properly aligned potatoes lying in said troughs will pass under said bands while improperly aligned potatoes will engage said bands and be restrained thereby,
at least one of said resilient bands being helically twisted.

* * * * *